(12) United States Patent  (10) Patent No.: US 8,666,001 B2
Naing et al.  (45) Date of Patent: Mar. 4, 2014

(54) METHOD AND APPARATUS FOR UPDATING SYMBOL RECOVERY PARAMETERS AND CORRECTING SYMBOL TIMING MISALIGNMENT

(75) Inventors: Kyaw M. Naing, Plantation, FL (US); Kevin G. Doberstein, Elmhurst, IL (US); Dongho Han, Parkland, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 332 days.

(21) Appl. No.: 13/183,854

(22) Filed: Jul. 15, 2011

(65) Prior Publication Data

US 2013/0016797 A1   Jan. 17, 2013

(51) Int. Cl.
*H03D 1/00* (2006.01)

(52) U.S. Cl.
USPC .......................................................... 375/343

(58) Field of Classification Search
USPC ......... 375/319, 324, 326, 340, 342–343, 355; 370/503, 509, 514
See application file for complete search history.

(56) References Cited

U.S. PATENT DOCUMENTS

| 5,711,005 | A | 1/1998 | Farrag |
| 5,905,945 | A | 5/1999 | Hill et al. |
| 5,926,767 | A | 7/1999 | Olds et al. |
| 6,445,423 | B1 * | 9/2002 | Bouillet et al. ............... 348/537 |
| 6,459,745 | B1 * | 10/2002 | Moose et al. ................. 375/355 |
| 6,707,861 | B1 * | 3/2004 | Stewart ......................... 375/321 |
| 6,731,711 | B1 * | 5/2004 | Jun ................................ 375/368 |
| 6,934,547 | B2 | 8/2005 | Suzuki |
| 7,203,254 | B2 | 4/2007 | Carsello et al. |
| 7,782,980 | B2 | 8/2010 | Wilson |
| 7,979,775 | B2 * | 7/2011 | Yu et al. ........................ 714/755 |
| 2002/0122517 | A1 * | 9/2002 | Kim .............................. 375/368 |
| 2011/0075771 | A1 | 3/2011 | Hiben et al. |
| 2011/0075774 | A1 | 3/2011 | Hiben et al. |

OTHER PUBLICATIONS

Kevin Doberstein—"An Adaptive Method for the Extraction of Channel Impairments From a Digital Synchronization Pattern"—Technical Disclosure—Prior Art Database—Motorola, Inc.—IP.com No. IPCOM000009419D—Original Publication Date: Sep. 1, 1999—Electronic Publication Date: Aug. 22, 2002—5 pages.

* cited by examiner

*Primary Examiner* — Khanh C Tran
(74) *Attorney, Agent, or Firm* — Barbara R. Doutre

(57) ABSTRACT

A radio receiver (100) includes a symbol recovery unit (108) the produces a raw symbol stream (112) and a recovered symbol stream (116). The recovered symbol stream is produced by applying symbol recovery parameters to the raw symbols. The symbol recovery parameters are updated (218) when the symbol recovery parameters used by the symbol recovery unit lack a requisite level of validity and there is a sufficient indication, based on successive instance of sync information using instance-specific recovery parameters, updated recovery parameters are valid.

14 Claims, 4 Drawing Sheets

METHOD AND APPARATUS FOR UPDATING SYMBOL RECOVERY PARAMETERS AND CORRECTING SYMBOL TIMING MISALIGNMENT

FIELD OF THE INVENTION

The invention relates generally to radio receivers, and more particularly to digital radio receivers and synchronization timing while receiving signals.

BACKGROUND OF THE INVENTION

In radio systems receivers must contend with a number of sources of potential error, which can include noise from sources external to the system, noise resulting from multipath effects, and Doppler shift or fade, among others. Dealing with these sources of error is particularly important in modern digital communications where parameters such as symbol synchronization, gain control, and direct current (DC) offset must be addressed to avoid losing synchronization and continue to properly decode incoming data.

Means have been developed that adequately deal with high fading conditions, where a receiver is moving at a relatively high speed from a transmitter, but in deep, slow fade conditions, these means may not be adequate. If not addressed, then these deep, slow fade conditions can cause intermittent communication. Therefore there is a need for a means that detects and corrects receiver operation in deep, slow fade conditions. Such means should not interfere with conventional fade correction that addresses higher fade rates.

BRIEF SUMMARY OF THE INVENTION

A radio receiver includes a symbol recovery unit the produces a raw symbol stream and a recovered symbol stream. The recovered symbol stream is produced by applying symbol recovery parameters to the raw symbols. The symbol recovery parameters are updated when the symbol recovery parameters used by the symbol recovery unit lack a requisite level of validity and there is a sufficient indication, based on successive instance of sync information using instance-specific recovery parameters, updated recovery parameters are valid.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
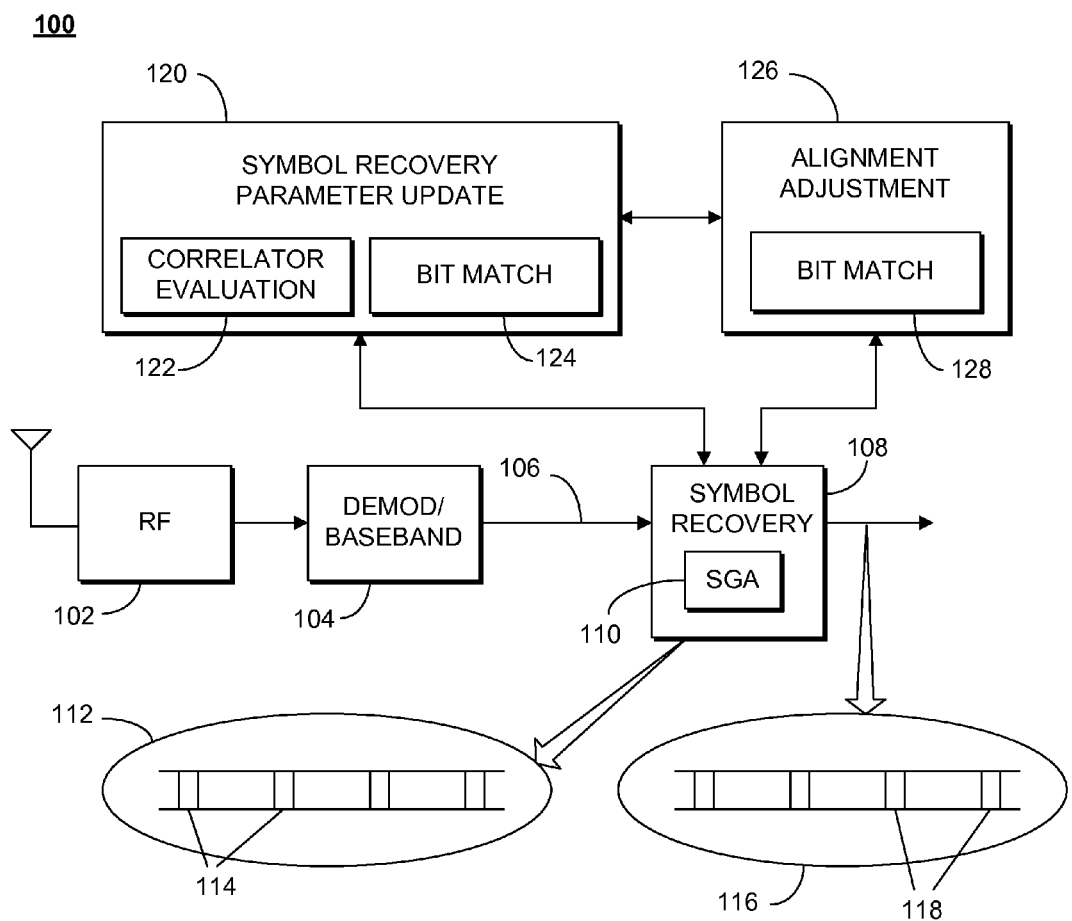
FIG. 1 shows a block schematic diagram of a digital radio receiver, in accordance with an embodiment.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Embodiments of the invention allow a digital radio receiver to deal with long, slow fade conditions, among other conditions that can affect proper reception and decoding of transmitted data by initiating a symbol recovery process using an initial set of symbol recovery parameters. The initial symbol recovery parameters can be derived during an initial synchronization and channel acquisition operation, and are used to modify the raw symbols obtained from a baseband signal resulting from a received signal. Two related processes are used to adjust the symbol recovery process as it runs, which are a symbol recovery parameter update process and an alignment update process. Both of these processes can cause the symbol recovery process to adjust its operation.

The symbol recovery parameter update process determines when new symbol recovery parameters are needed, calculates or determines the new parameters, and updates the symbol recovery parameters used by the symbol recovery process. The alignment update process determines if there has been a timing mismatch, and if so, which way, and causes the symbol recovery process to add a symbol or delete a symbol, according to the direction, in time, of the shift. The received signal contains instances of synchronization, or just "sync," information. The sync information includes a known bit or symbol pattern. Typically the sync information is used during initial sync acquisition when a receiver commences receiving on a given channel to determine timing, such as frame timing. The symbol recovery process processes the baseband signal to produce a stream of raw symbols, and a stream of recovered symbols. The recovered symbols are produced from the raw symbols by applying the symbol recovery parameters to adjust or compensate the raw symbols. During initial sync acquisition, the symbol recovery parameters are determined from one or more instances of sync information, and can include parameters indicating a direct current (DC) offset and an automatic gain control (AGC) factor. The DC offset determines an absolute adjustment to be made in the received raw symbols, and the AGC factor determines a scaling to be applied to the raw symbols.

The symbol recovery parameter update process generally determines new symbol recovery parameters after the symbol recovery parameters used by the symbol recovery process begin to degrade, and there is an indication that new symbol recovery parameters will be successful, as indicated by successfully comparing successive instances of sync information with the known pattern using recovery parameters derived from each of those instances specifically, rather than the recovery parameters used by the symbol recovery process. The alignment adjustment process interoperates with the symbol recovery parameter update process, and determines if, when symbol recovery parameters used by the symbol recovery process, experiences sufficient error, there has been a shift. When the symbol recovery process are not producing undue errors, the symbol recovery parameter update process can be effectively suspended to prevent it from unnecessarily issuing an update to the symbol recovery process.

Embodiments of the invention can be performed with computing hardware, such as one or more processors, executing instruction code to process received radio frequency signal that have been digitized. The instruction can be stored in a non-transitory computer or machine readable medium The instruction code can be stored as computer program product in a non-transitory computer readable medium, and when the instruction code is executed by a suitable processor the processes of the various embodiments are performed.

Referring to FIG. 1, there is shown a block schematic diagram of a digital radio receiver 100, in accordance with an embodiment. It will be appreciated by those skilled in the art that the blocks shown here are meant to be interpreted as abstractions of functions of a receiver. The receiver generally includes hardware elements, including one or more processors, as well as software or instruction code for performing the processes described generally here, as well as other processes. The diagram is not meant to be an exhaustive description of a radio receiver that operates in accordance with embodiments of the invention, but rather is intended to focus on specific aspects in order to inform those of ordinary skill in the field as to the operation and functions of the various embodiments.

The receiver includes a radio frequency (RF) front end 102 which collect RF signals from an antenna, amplifies, and filters them, as is conventional. An amplified and filtered RF signal is fed from the RF front end 102 to a demodulator and baseband processor 104, that demodulates the signal and produces a baseband signal. In one embodiment the received signal can be modulated using harmonized differential quadrature phase shift keyed modulation (H-DQPSK). The base band signal 106 can be an oversampled signal that provides several samples per symbol interval. In one embodiment the baseband signal can have a symbol rate of 6K symbols per second and be sampled at a rate of 30 KHz, providing 5 samples per symbol interval.

A symbol recovery unit 108 generally processes the baseband signal 106 using a symbol recovery process to produce a raw symbol stream 112, and a recovered symbol stream 116. The symbol recovery unit 108 extracts symbols from the baseband signal based on known symbol timing. In at least one embodiment the symbol recovery unit 108 can use a stochastic gradient algorithm (SGA) 110 to extract symbols from the baseband signal. The SGA (110) is a well know process for timing recovery in digital systems (see, for example, "Digital Communication: Third Edition" by John R. Barry, David G. Messerschmitt and Edward A. Lee, Springer, 2003). The SGA 110 generally extracts the waveform slope at the symbol center, and uses this information, together with the symbol error, to drive the delay in variable delay filters to minimize the symbol timing error. The raw symbols 112 are further processed by applying the symbol recovery parameters to produce the recovered symbols 116. Both the raw symbol stream 112 and the recovered symbol stream 116 include instances of sync information 114, 118, respectively.

The symbol recovery process interacts with a symbol recovery parameter update process 120 and an alignment adjustment process 126. Each of these processes can be implemented using different processors in communication with each other, or they can be implemented as processes on a shared processor, or by any other conventional arrangement. The symbol recovery parameter update process 120 generally determines when to update the symbol recovery parameters used by the symbol recovery process 108, as well as the new values to be used. Generally, once the symbol recovery parameters used by the symbol recovery process begins to experience a threshold bit error rate, and updated recovery parameters, as derived from successive instances of sync information, indicate updated symbol recovery parameters will satisfy the desired bit error rate, the process 120 will provide updated symbol recovery parameters to the symbol recovery unit or process 108.

In determining that new symbol recovery parameters would improve symbol recovery operation in one embodiment, the symbol recovery parameter update unit 120 includes a correlation unit 122 and a bit matching unit 124. Instances of sync information 114 in the raw symbol stream are processed by the symbol recovery parameter update unit 120 by first determining instance-specific symbol recovery parameters for the particular instance of sync information, and applying the instance-specific sync parameters to the raw sync information to produce adjusted sync information. The unit 120 can then commence performing a correlation of the raw sync information with the known sync pattern. If the correlation results indicate a poor correlation, as indicated, for example, by a threshold, no action is taken. If the correlation result is sufficient, then the unit 120 can perform a bit matching operation to determine how many bits match between the adjusted sync information and the known sync pattern. When the unit 120 has had successive instance of sync information pass the correlator and bit matching tests, the unit 120 can issue updated symbol recovery parameters to the symbol recovery unit 108 that are based on one or more successive instances of sync information which passed those tests. In at least one embodiment, the unit 120 can maintain a count variable indicating the number of successive instances that pass the tests. Whenever a sync instance fails a test, either the correlation or the bit matching, the count can be reset, thus guaranteeing that an update is only issued when there have been the desired number of successive instances of sync information that pass the test, which indicate channel conditions are sufficiently stable that accurate symbol recovery can be resumed with updated symbol recovery parameters.

The alignment adjustment unit 126 interacts with the symbol recovery parameter update unit 120, and inhibits updates by the symbol recovery parameter update unit 120 when the symbol recovery parameters used by the symbol recovery unit appear to be valid, as indicated by a bit matching operation 128. The bit matching operation 128 compares instances of recovered sync information 118 with the known sync pattern, and when there is a sufficiently low bit error rate, meaning a sufficient number of bits match, the alignment adjustment unit resets the count of successive instances kept by the symbol recovery parameter update unit 120.

Figure 2:
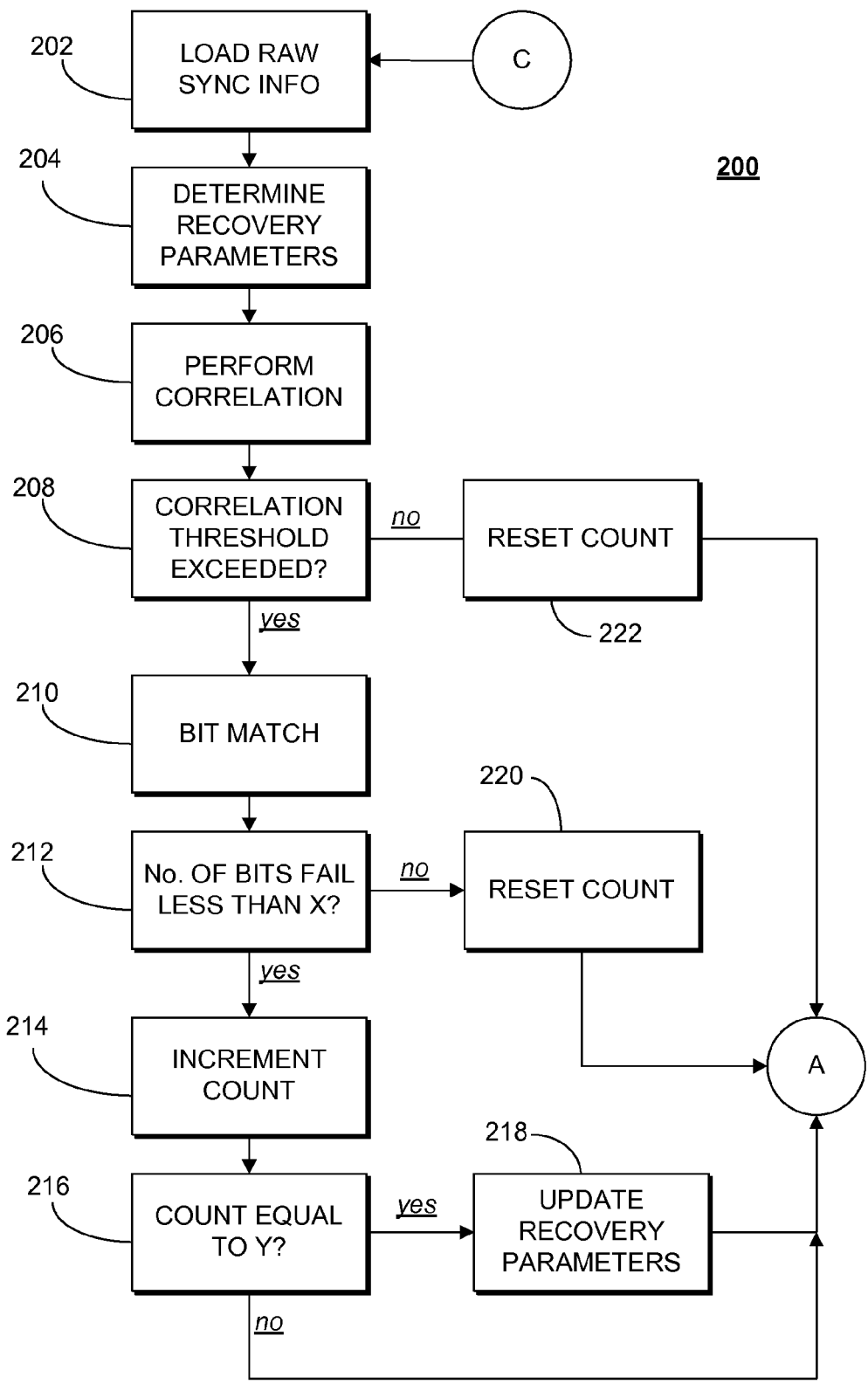
FIG. 2 shows a flow chart diagram of a symbol recovery parameter adjustment process, in accordance with an embodiment.

FIG. 2 shows a flow chart diagram of a symbol recovery parameter adjustment process 200, in accordance with an embodiment. The process 200 can be implemented, for example, by symbol recovery parameter update unit 120 of FIG. 1. Generally, the process 200 determines a number of successive instances of sync information that pass certain tests of sync integrity against the known sync pattern, and when a sufficient number of valid sync instances occur, the process 200 can apply updates to the symbol recovery parameters used by the symbol recovery process. However, generally speaking, a pre-requisite for an update to be issued is that there is an indication that the symbol recovery parameters used by the symbol recovery process are no longer valid.

Accordingly, the process can commence by loading an instance of raw sync information 202. The raw sync information is produced by the symbol recovery process along with the other symbols produced by the symbol recovery process.

The process 200 then determines instance-specific recovery parameters 204, such as DC offset and an AGC factor and applies these to the raw sync information to produce adjusted sync information. The process 200, in the present embodiment, then performs a correlation 206 of the adjusted sync information for the present instance and the known sync pattern. At a decision block 208, if the correlation is sufficiently high, indicating a threshold degree of similarity between the adjusted sync information and the known sync pattern, the process can move to a second test, such as a bit matching test 210. The adjusted sync information is compared to the known sync pattern on a bit by bit basis, and the number of bits that pass, or fail, or both, are determined. If the number of bits that fail to match, as determined in decision block 212, is less than a preselected number, then the process 200 can increment a count 214. The count can then be evaluated 216, and if the count is sufficiently high, equal to a preselected number of successive instances, the process 200 can issue updated symbol recovery parameters 218.

In at least one embodiment the sync instances can be 20 symbols, or 40 bits long. In at least one embodiment the correlation test 208 can be passed if the correlation exceeds 80%. In at least one embodiment the preselected number of bits that can fail and the bit matching test 212 still pass is proportional to 7 out of 40 bits.

If the correlation threshold is not met, or if the number of bits that fail the bit matching exceeds the preselected number, the count of successive instances can be reset 222, 220, respectively. The exit out of the process 200, to point "A," can occur after the update is issued 218, or when either of the tests 208, 212 fail and the count is reset. Point "A" can be an entry into the alignment adjustment process.

Figure 3:
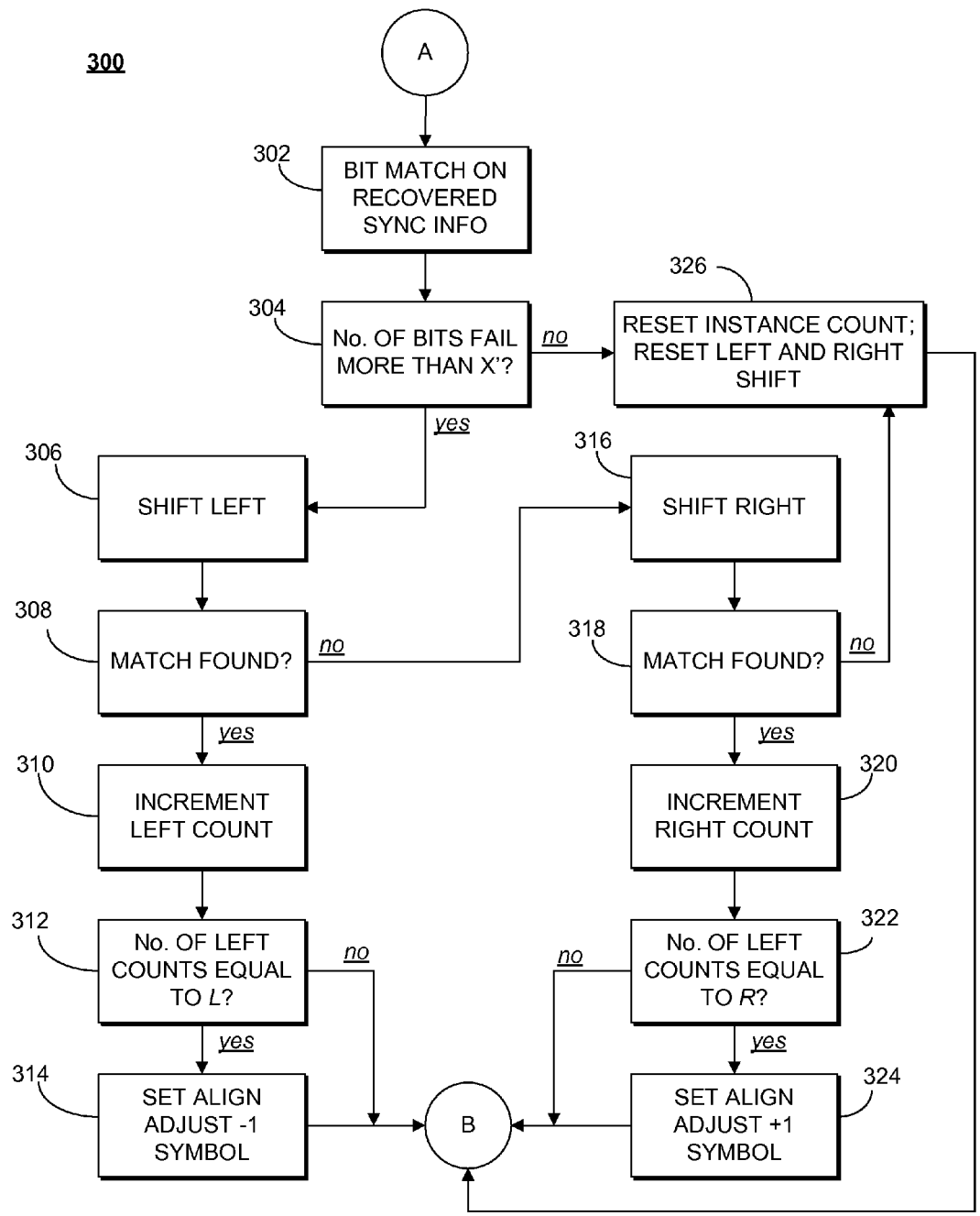
FIG. 3 shows a flow chart diagram of an alignment adjustment process, in accordance with an embodiment.

FIG. 3 shows a flow chart diagram of an alignment adjustment process 300, in accordance with an embodiment. The process 300 commences by performing a bit matching evaluation 302 on a present instance of recovered sync information. The recovered sync information is produced by the symbol recovery process using the symbol recovery parameters presently in use by the symbol recovery process. The instance of recovered sync information can correspond, in time, to the instance of raw sync information used by the symbol recovery parameter update process. The process 300 determines 304 the number of bits that fail to match. If more than a preselected number of bits fail to match, the process can determine if there has been a shift or time mismatch. In the present embodiment, the process 300 can shift the known sync pattern to the left by one symbol 306, and then compare a corresponding portion of the recovered sync information with the left-shifted version of the known sync pattern. The matching indicates a match, a left count can be incremented. If the left count has been incremented to a threshold or preselected number 312, indicating successive instances of recovered sync information indicate a left shift, the process 300 can issue an alignment adjustment of −1 symbol, meaning the symbol recovery process will delete a symbol from the recovered symbol stream in order to realign the symbol timing.

If the left shift fails at box 308, then a right shift can be tried 316. A right-shifted version of the known sync pattern can be compared to a portion of the recovered sync information. If a right shifted match is found at test 320, then a right count can be incremented 320. If the right count has been incremented to a threshold or preselected number 322, indicating successive instances of recovered sync information indicate a right shift, the process 300 can issue an alignment adjustment of +1 symbol, meaning the symbol recovery process will add a symbol to the recovered symbol stream in order to realign the symbol timing. If either of the shift count tests fail because they have not incremented to a sufficiently high number, they process can exit out at point "B."

Going back to test 304, for the bit matching, if the bit error rate does not exceed the threshold, it indicates that the symbol recovery parameters presently in use by the symbol recovery process are still valid. Accordingly, the process 300 resets the instance count used by the symbol recovery parameter update process to track successive instances of the adjusted sync information passing the correlation and bit matching tests 326. The process 300 also resets the increment counts used to track successive instances of shifted sync information. Thus, if the symbol recovery parameters presently in use by the symbol recovery process are valid, by resetting the instance count used by the symbol recovery parameter update process, the symbol recovery parameter update process is inhibited from updating the symbol recovery parameters because it will not reach the required count of successive instances of "good" adjusted sync information, i.e. passing the correlation and bit matching tests.

Figure 4:
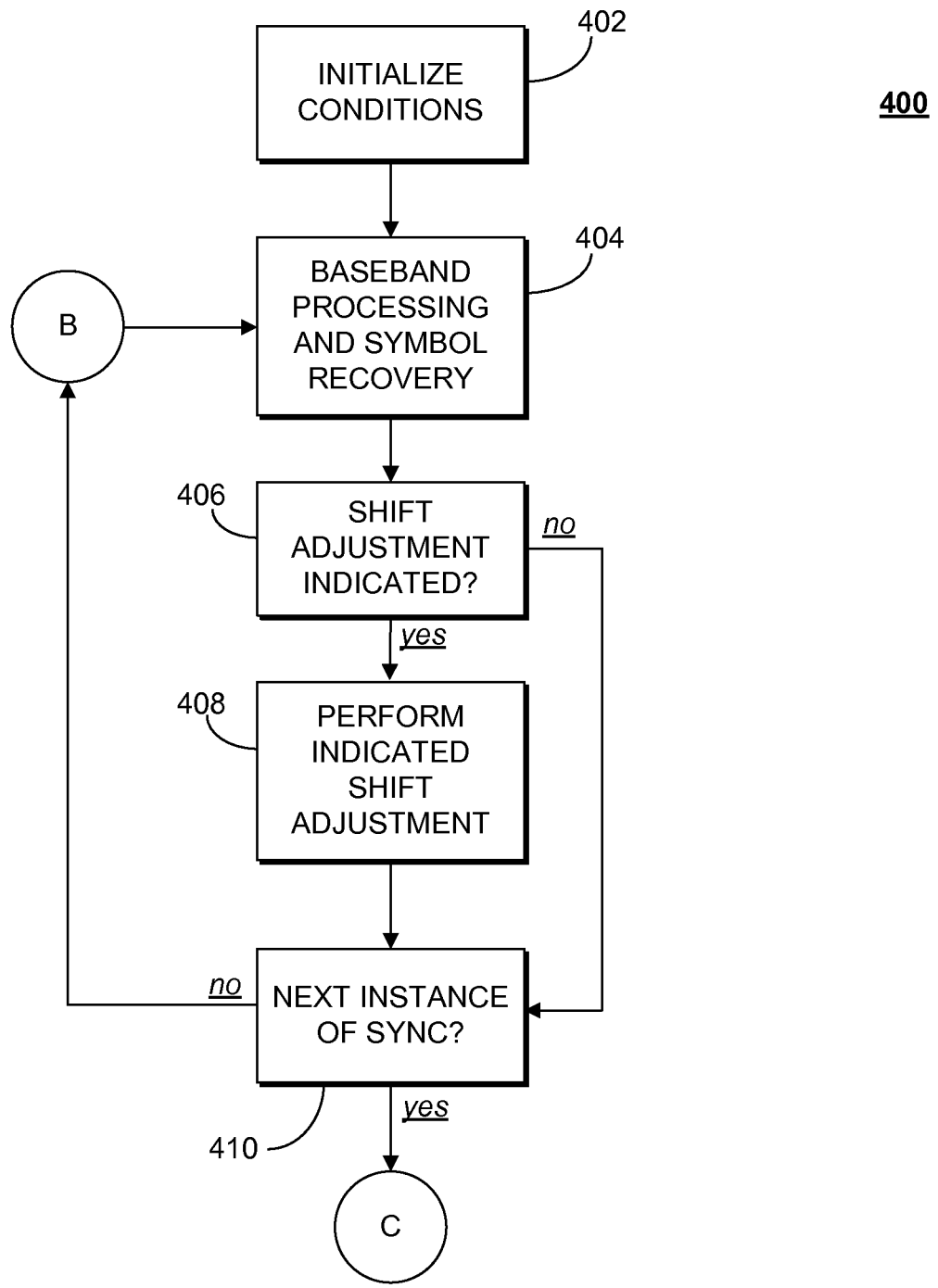
FIG. 4 show a flow chart diagram of an initial and update process for adjusting a symbol recovery process, in accordance with an embodiment.

FIG. 4 show a flow chart diagram of an initial and update process for adjusting a symbol recovery process 400, in accordance with an embodiment. The present process 400 can interoperate with processes such as those exemplified by FIGS. 2 and 3. Process 400 can also be used to initialize the symbol recovery process. Accordingly, when the symbol recovery process is being initialized 402, the symbol recovery process is given initial symbol recovery parameters as determined, for example in the channel acquisition process. The symbol recovery process processes the baseband signal to produce raw and recovered symbols 404, and can operate continuously, or in it can batch process over number of symbol intervals, frames, or other amount of data. The baseband processing block 404 can be an entry point from point "B," which was the exit point for the process 300 of FIG. 3. However, the processes of FIGS. 2 and 3 may have issued updates to the symbol recovery and baseband process. If updated symbol recovery parameters have been issued, such as by a process in accordance with that shown in FIG. 2, then the process 400 can begin using the update symbol recovery parameters at baseband processing block 404. Accordingly, process 400 can determine if there has been a shift adjustment issued 406. If there has been a shift adjustment indicated, the process 400 can take the corresponding action, shifting ±1 symbol 408, and the shift indication is reset. Once the shift has been accomplished, or if there is no shift indicated at box 406, then the process 400 can determine if there has been a new occurrence of a sync instance 410. If there has been no new sync instance in the symbol recovery output, the process 400 returns to process more, or continue processing, the baseband signal to produce more symbols. If a new sync instance has occurred, the process exits at point "C," which, as indicated in FIG. 2, commences the symbol recovery parameter update process 200. Therefore, it will be appreciated by those skilled in the art that the processes of FIGS. 2-4 are iterative. In at least one embodiment, the symbol recovery parameter update process and alignment adjustment process can operate essentially as background processes while the symbol recovery process operates, and they can occasionally update or adjust the symbol recovery process as taught herein.

Accordingly, at least one embodiment includes a method for processing a received digital signal that can be commenced by initiating a symbol recovery process. The symbol recovery process uses initial symbol recovery parameters to produce recovered symbols from raw symbol information by applying the initial symbol recovery parameters to the raw symbol information. The initial symbol recovery parameters are those symbol recover parameters initially used by the symbol recovery process, for example, during a present iteration of the method, before being updated. Once they are updated, the updated symbol recovery parameters will then become the initial symbol recovery parameters in subsequent iterations of the method. Symbol recovery parameters generally are used to modify raw symbols to take into account reception conditions such as, for example, DC offset and the AGC factor. The received signal, and hence, the raw symbol information, includes periodic instances of sync information. Each instance of sync information is a sequence of symbols or bits. The sync information, as transmitted, is a known sync pattern or sequence of bits that is periodically transmitted in the signal to allow a receiver to acquire channel synchronization. For each instance of sync information, a method embodiment can determine an instance-specific set of symbol recovery parameters for the instance of sync information. The instance-specific symbol recovery parameters are obtained from that particular instance of raw sync information, and can be different than the initial symbol recovery parameters, which are used for symbol recovery for every symbol by the symbol recovery process until they are update. The method can adjust the raw sync information based on the instance-specific set of symbol recovery parameters to produce adjusted sync information. The process is substantially similar to that used by the symbol recovery process, and can be accomplished by passing the raw sync information and instance-specific set of symbol recovery parameters to the symbol recovery process and having the symbol recovery process return the adjusted synch information. The method then correlates the adjusted sync information with a known sync pattern to determine whether the adjusted sync information passes or fails a correlation threshold. The correlation threshold can be a preselected static value. When the adjusted sync information passes the correlation threshold, the method performs a bit matching to determine a number of bits that match between the adjusted sync information and the known sync pattern. The bit matching is simply a bit by bit comparison to determining how many bits are identical, or different, or both. The method maintains a count of a number of consecutive sync instances when both the adjusted sync information passes the correlation threshold and the bit matching indicates less than a preselected number of bits fail to match. The count can be kept in a variable in memory. When then count of the number of consecutive instances reaches a preselected number of consecutive instances, the method updates the symbol recovery parameters used by the symbol recovery process based on a recalculation of the symbol recovery parameters for one or more of the consecutive sync instances. In at least one embodiment, the preselected number of consecutive instances is two consecutive instances. When, upon performing the bit matching between the adjusted sync information and the known sync pattern and more than the preselected number of bits fail to match, the method resets the count of the number of consecutive instances.

Other embodiments can include a radio receiver, including a demodulator. The demodulator demodulates a received signal and produces a baseband signal from the received signal. The radio receiver can further include a symbol recovery unit that processes the baseband signal to produce a raw symbol stream and a recovered symbol stream. The recovered symbol stream can be produced using initial symbol recovery parameters. The raw symbol stream and the recovered symbol stream each contain periodic instances of sync information. The radio receiver can further include a symbol recovery parameter update unit. The symbol recovery parameter update unit provides updated symbol recovery parameters to the symbol recovery unit upon a preselected successive plurality of instances of sync information meeting minimum validity conditions, as determined using instance-specific symbol recovery parameters. The validity can be determined, for example by performing a bit matching on the recovered sync information in the recovered symbol stream with the known sync pattern, and determining a number of bits that match, or fail to match, or both. When the initial symbol recovery parameters used by the symbol recovery unit do not meet a threshold validity condition, such as when the bit matching indicates to many bit fail to match, the symbol recovery parameter unit is inhibited from providing updated symbol recovery parameters when the symbol recovery parameters used by the symbol recovery unit do meet the threshold validity condition. The radio receiver can further include an alignment adjustment unit that determines a shift adjustment in the recovered symbol stream when the initial symbol recovery parameters used by the symbol recovery unit do not meet a threshold validity condition and a shifted version of a known sync pattern matches a portion of a plurality of successive instances of recovered sync information.

This invention can be embodied in other forms without departing from the spirit or essential attributes thereof. Accordingly, reference should be made to the following claims, rather than to the foregoing specification, as indicating the scope of the invention.

What is claimed is:

1. A method for processing a received digital signal, comprising:

initiating a symbol recovery process using initial symbol recovery parameters to produce recovered symbols from raw symbol information by applying the initial symbol recovery parameters to the raw symbol information, the raw symbol information including periodic instances of sync information;

for each instance of sync information, determining an instance-specific set of symbol recovery parameters for the instance of sync information;

adjusting the raw sync information based on the instance-specific set of symbol recovery parameters to produce adjusted sync information correlating the adjusted sync information with a known sync pattern to determine whether the adjusted sync information passes or fails a correlation threshold;

when the adjusted sync information passes the correlation threshold, performing a bit matching to determine a number of bits that match between the adjusted sync information and the known sync pattern;

maintaining a count of a number of consecutive sync instances when both the adjusted sync information passes the correlation threshold and the bit matching indicates less than a preselected number of bits fail to match;

when then count of the number of consecutive instances reaches a preselected number of consecutive instances, updating the symbol recovery parameters used by the symbol recovery process based on a recalculation of the symbol recovery parameters for one or more of the consecutive sync instances; and when, upon performing the bit matching between the adjusted sync information and the known sync pattern and more than the preselected number of bits fail to match, resetting the count of the number of consecutive instances.

2. The method of claim 1, wherein the symbol recovery parameters include a direct current (DC) correction parameter and an automatic gain control correction parameter.

3. The method of claim 1, further comprising, upon performing the bit matching between the adjusted sync information and the known sync pattern, and at least the preselected number of bits fail to match between the adjusted sync information and the known sync pattern, resetting the count of the number of consecutive instances.

4. The method of claim 1, further comprising:
performing a bit matching between recovered sync information produced by the symbol recovery process using the initial symbol recovery parameters and the known sync pattern; and
when the number of bits that fail to match between the recovered sync information and the known sync pattern is less than a preselected number, resetting the count of the number of consecutive instances.

5. The method of claim 4, further comprising:
when the number of bits that match between the recovered sync information and the known sync pattern is less than the preselected number, determining whether the recovered sync information matches a shifted version of the known sync pattern, and when the recovered sync information matches the shifted version of the sync pattern, providing a shift correction to the symbol recovery process; and
when the number of bits that match between the recovered sync information and the known sync pattern is less than the preselected number and the recovered sync information does not match the shifted version of the known sync pattern resetting the number of consecutive sync instances used in determining that the plurality of consecutive instances of sync information sufficiently match the known sync pattern.

6. The method of claim 5, wherein determining whether the recovered sync information matches the shifted version of the known sync pattern comprises determining that the recovered sync information corresponding to each of a plurality of consecutive sync instances match the shifted version of the known sync pattern before providing the shift correction to the symbol recovery process.

7. The method of claim 5, wherein determining whether the recovered sync information matches the shifted version of the known sync pattern comprises comparing the recovered sync information to both a left-shifted and a right-shifted version of the known sync pattern.

8. The method of claim 5, further comprising adjusting the symbol recovery process by an amount and a direction of shift indicated by the shift correction.

9. A radio receiver, comprising:
a demodulator for demodulating a received signal and producing a baseband signal;
a symbol recovery unit that processes the baseband signal to produce a raw symbol stream and a recovered symbol stream, the recovered symbol stream produced using initial symbol recovery parameters, the raw symbol stream and the recovered symbol stream each containing periodic instances of sync information;
a symbol recovery parameter update unit that provides updated symbol recovery parameters to the symbol recovery unit upon a preselected successive plurality of instances of sync information meeting minimum validity conditions, as determined using instance-specific symbol recovery parameters, when the initial symbol recovery parameters used by the symbol recovery unit do not meet a threshold validity condition, and wherein the symbol recovery parameter unit is inhibited from providing updated symbol recovery parameters when the symbol recovery parameters used by the symbol recovery unit do meet the threshold validity condition; and
an alignment adjustment unit that determines a shift adjustment in the recovered symbol stream when the initial symbol recovery parameters used by the symbol recovery unit do not meet a threshold validity condition and a shifted version of a known sync pattern matches a portion of a plurality of successive instances of recovered sync information.

10. The radio receiver of claim 9, wherein the symbol recovery parameter update unit comprises:
a correlation evaluation unit that performs a correlation of an instance of adjusted sync information with the known sync pattern, the adjusted synch information produced from an instance of raw sync information using the instance-specific symbol recovery parameters; and
a bit matching unit that, when the correlation meets a preselected correlation threshold, determines a number of matching bits between the adjusted sync information and the known sync pattern;
wherein the updated symbol recovery parameters are produced when the correlation is sufficiently high and the number of matching bits indicates less than a preselected number of bits fail to match over a preselected number of a plurality of successive instances of sync information.

11. The radio receiver of claim 10, wherein the preselected number of the plurality of successive instances of sync information is two successive instances.

12. The radio receiver of claim 10, wherein the preselected correlation threshold is 80 percent.

13. The radio receiver of claim 9, wherein the alignment adjustment unit determines whether the shift adjustment is a right shift or a left shift, and wherein in response to the shift adjustment being a left shift the symbol recovery unit deletes a symbol from the recovered symbol stream, and in response to the shift adjustment being a right shift the symbol recovery unit adds a symbol to the recovered symbol stream.

14. The radio receiver of claim 9, wherein the updated symbol recovery parameters are used by a stochastic gradient algorithm executed by the symbol recovery unit.

* * * * *

UNITED STATES PATENT AND TRADEMARK OFFICE
CERTIFICATE OF CORRECTION

| | | |
|---|---|---|
| PATENT NO. | : 8,666,001 B2 | Page 1 of 1 |
| APPLICATION NO. | : 13/183854 | |
| DATED | : March 4, 2014 | |
| INVENTOR(S) | : Naing et al. | |

It is certified that error appears in the above-identified patent and that said Letters Patent is hereby corrected as shown below:

On the title page, item 57, under "ABSTRACT", in Column 2, Line 2, delete "the produces a" and insert -- that produces a --, therefor.

In the specification

In Column 1, Lines 35-36, delete "the produces a" and insert -- that produces a --, therefor.

In Column 3, Line 7, delete "medium The" and insert -- medium. The --, therefor.

In Column 5, Line 61, delete "320," and insert -- 318, --, therefor.

In Column 7, Line 30, delete "synch" and insert -- sync --, therefor.

In the claims

In Column 8, Line 41, in Claim 1, delete "information" and insert -- information; --, therefor.

In Column 10, Line 27, in Claim 10, delete "synch" and insert -- sync --, therefor.

Signed and Sealed this
Third Day of May, 2016

Michelle K. Lee
*Director of the United States Patent and Trademark Office*